Sept. 22, 1953

C. E. ADAMS 2,652,780

HYDRAULIC PRESSURE BOOSTER

Filed Nov. 2, 1949

INVENTOR.
Cecil E. Adams
BY
Herschel C. Omohundro
ATTORNEY.

Sept. 22, 1953 C. E. ADAMS 2,652,780
HYDRAULIC PRESSURE BOOSTER
Filed Nov. 2, 1949 3 Sheets-Sheet 2
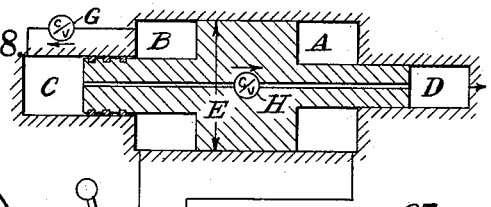
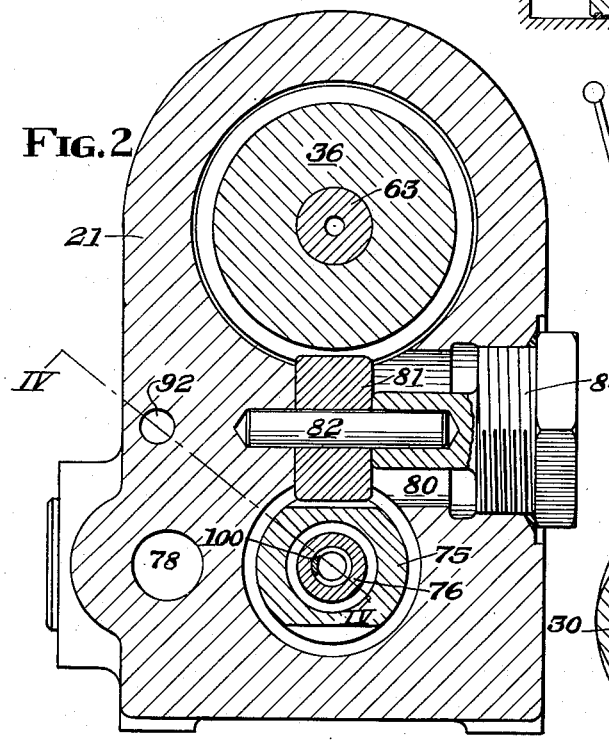
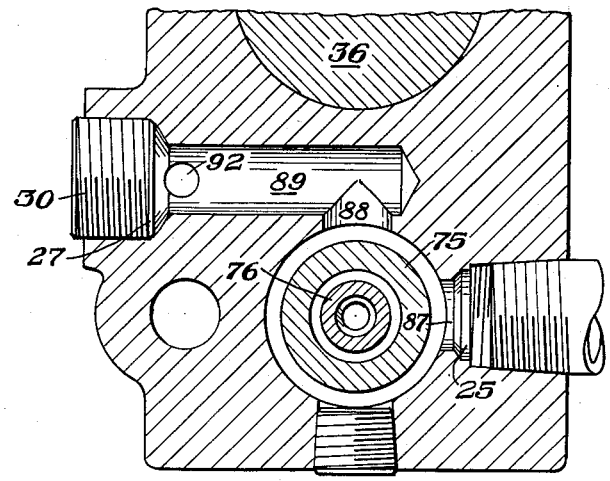
INVENTOR.
*Cecil E. Adams*
BY
*Herschel C. Onohundro*
ATTORNEY.

Sept. 22, 1953 — C. E. ADAMS — 2,652,780
HYDRAULIC PRESSURE BOOSTER
Filed Nov. 2, 1949

INVENTOR.
Cecil E. Adams
Herschel C. Omohundro
ATTORNEY.

Patented Sept. 22, 1953

2,652,780

UNITED STATES PATENT OFFICE 2,652,780

HYDRAULIC PRESSURE BOOSTER

Cecil E. Adams, Columbus, Ohio, assignor to The Denison Engineering Company, Columbus, Ohio, a corporation of Ohio Application November 2, 1949, Serial No. 125,141

13 Claims. (Cl. 103—47)

This invention relates generally to hydraulic apparatus and is particularly directed to a hydraulic pressure booster which utilizes hydraulic fluid at low pressure to supply hydraulic fluid at high pressure.

One of the objects of the present invention is to provide a hydraulic pressure booster having a simplified construction embodying a minimum number of working parts particularly in the high pressure section of the device.

Another object of the invention is to provide a hydraulic pressure booster designed according to new formulas and embodying new principles never used before in devices of a similar character.

It is another object of the invention to provide a double acting, hydraulic pressure booster which will be fully automatic in operation and involve not more than two check valves, the construction being such that the high pressure will be confined to a very small space and will require only simple seals to prevent the escape of such pressure.

A further object of the invention is to provide a hydraulic pressure booster having a single, one-piece body with motor and valve cylinders and a piston in the motor cylinder, the piston being provided with pump cylinders for the reciprocation of additional pistons, the construction being such that the various pistons will be self-aligned, thus avoiding problems in the manufacture and assembly of the device.

A still further object of the invention is to provide a hydraulic pressure booster having a motor unit and an automatic valve, the valve and motor unit embodying principles contained in applicant's Patent No. 2,470,086 dated May 17, 1949, modifications in such principles being made to improve the operation of the device.

Another object of the invention is to provide a hydraulic pressure booster having a combination motor and pump unit and an automatic valve, the latter being so designed that the piston of the motor will be caused to make reciprocations of fixed length and in the event the piston is interrupted in its movement in either direction, it will continue the operation in such direction after the impediment has been removed.

A further object of the invention is to provide a fully automatic hydraulic pressure booster having a reciprocating piston and an automatic reversing valve in which no dead center position will exist, the device being capable of starting in operation regardless of the position occupied by the piston at the time previous operation was interrupted.

It is an object of the invention also, to provide an improved automatic valve for a hydraulic pressure booster, the valve having a pilot portion moved mechanically by the motor piston and a spool portion partially responsive to fluid pressure to cause the operation of the piston in a certain direction, the first-mentioned portion of the valve being normally biased toward a certain position and having means provided in connection therewith to retain the other portion in a predetermined position until the piston of the device has completed its travel in such certain direction, means cooperating with the spool portion to shift it to another position when the piston has reached the end of its travel in such direction to automatically cause the piston to move in the opposite direction.

Further objects and advantages of the present invention will be apparent from the following description, reference being had to the accompanying drawings wherein a preferred form of embodiment of the invention is clearly shown.

In the drawings:

Fig. 2 is a vertical, transverse, sectional view taken through the pressure booster on the plane indicated by line II—II of Fig. 1.

Fig. 3 is a similar view taken on the plane indicated by the line III—III of Fig. 1.

Fig. 4 is a longitudinal, sectional view taken on a plane indicated by the angular line IV—IV of Fig. 2.

Fig. 8 is a diagrammatic view of a modified form of pressure booster incorporating the principles of the present invention.

Figure 1:
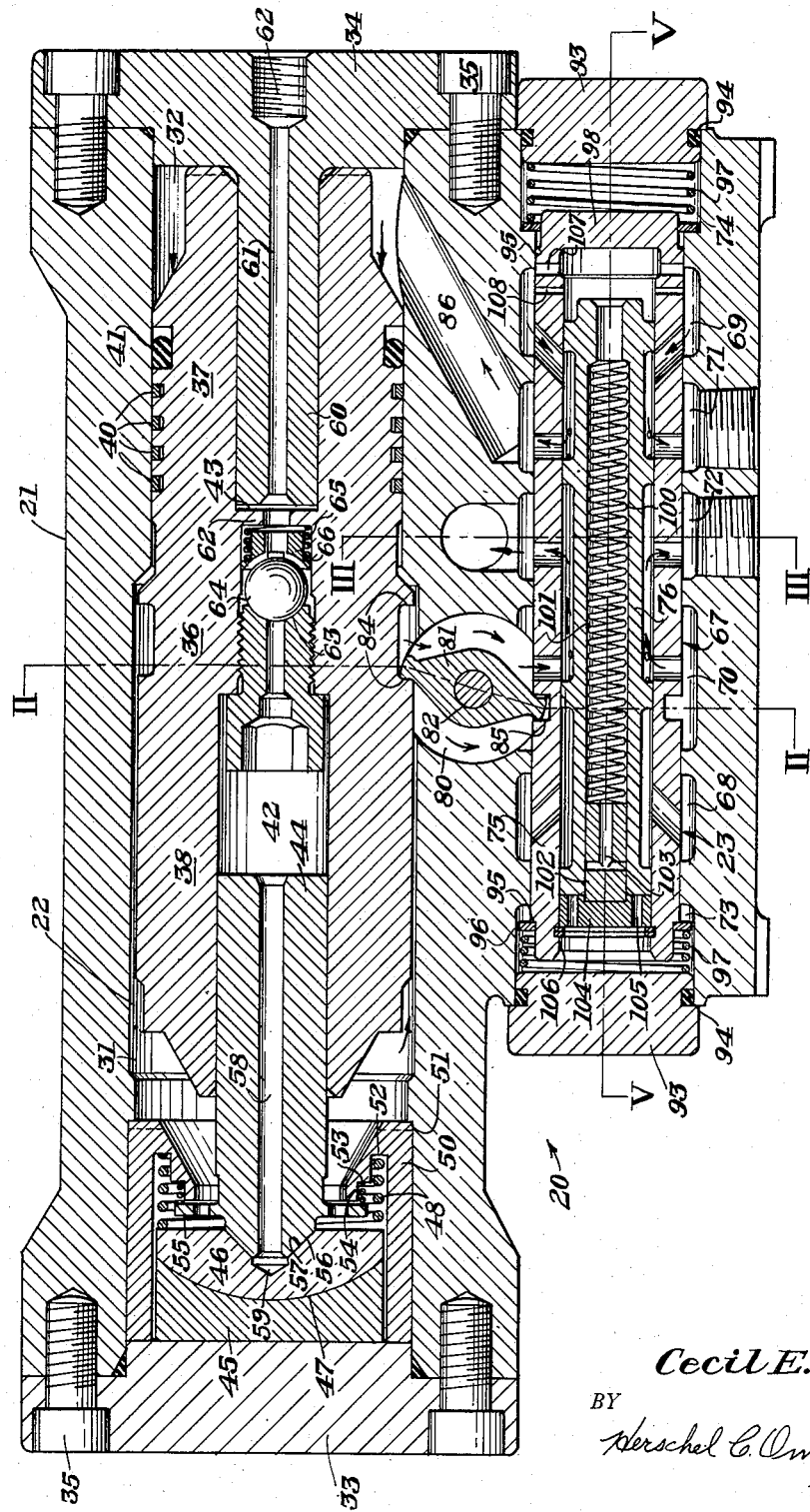
Fig. 1 is a vertical, longitudinal, sectional view taken through the hydraulic pressure booster forming the subject matter of the present invention, the movable parts of the booster being disclosed in one position of operation.

Referring more particularly to the drawings, the numeral 20 designates the hydraulic pressure booster in its entirety.

This hydraulic pressure booster is a self-contained unit and in general includes a casing with a combination motor and pump and a control valve mechanism which functions to effect the automatic operation of the motor and pump. The device has an inlet for relatively low pressure fluid which drives the motor and an outlet for the spent fluid as well as a second outlet from the pump portion for fluid at high pressure. The combination motor and pump comprises a main piston member and a pair of smaller piston elements which operate concurrently with the main piston. The relative movement of the piston members and casing serves to pump fluid from the casing through the piston member to the high pressure outlet. Due to the differential in areas between the pistons, the pressure of the fluid passing through the piston member will be multiplied when a resistance to such flow is exerted.

Two forms of the invention are shown in the drawings, one form is shown in detail in Figures 1 to 7, inclusive, and the other form is shown only diagrammatically in Fig. 8. The principles are the same in both forms, the details of construction only being different. In both forms of the invention a main or motor piston and two smaller or pump pistons of different sizes are employed. In both forms the discharge from the larger pump cylinder passes to the smaller pump cylinder and then flows to the single high pressure fluid outlet. In both forms a check valve is provided in the inlet for the larger pump cylinder and a second check valve is used between the larger and smaller pump cylinders; these are the only check valves employed. Any suitable control valve for governing the operation of the motor piston may be utilized but in the form of the invention shown in Fig. 8 a manually operated fourway valve F has been illustrated; an automatically reversing fourway valve has been shown in Figures 1 to 7, inclusive.

The present invention involves principles of operation which, to applicant's present knowledge, were never employed before in devices of a similar character. The design of the pressure booster forming the subject matter of the invention was the result of a calculation procedure developed by applicant. In developing such procedure applicant selected the largest or motor bore area, identified by the letter E in Fig. 8, and the desired ratio which was determined by dividing the higher pressure desired by the selected lower operating fluid pressure. The area of the smallest pump piston was then determined by dividing the largest bore area E by the selected ratio. The effective area of one side of the motor piston, identified by the letter A in Fig. 8 was then found to be the difference between the area E of the large bore and the area of the smallest bore indicated by the letter D. The area of the intermediate size piston, identified by the letter C in Fig. 8 was then determined by adding the area D and the quotient of the area A divided by the ratio.

In general the operating principles of the pressure boosters shown are as follows referring particularly to Fig. 8. The fluid under operating pressure supplied to the inlet of the device is alternately directed by a valve mechanism F to opposite ends of the piston to effect its reciprocation.

When this fluid is supplied to the left end B of the casing it will open the check valve, indicated in Fig. 8 by the letter G, and flow into the chamber C at the end of the larger pump piston. The fluid under pressure in chambers B and C urges the motor piston toward the right, causing fluid in chamber D at the end of the smaller pump piston, to be discharged through the high pressure outlet. After the motor piston has completed its stroke toward the right the valve F is actuated to supply fluid under pressure to the right end A of the casing. This fluid will urge the motor piston toward the left causing fluid in the chamber at B to flow to exhaust. Fluid in chamber C will be prevented from flowing to chamber B by check valve G so it will open check valve H and flow to chamber D. Since the volume of chamber C is greater than the volume of chamber D some of the fluid displaced from the former by the larger pump piston will be discharged through the high pressure outlet as the motor piston moves toward the left. The next stroke of the motor piston toward the right will cause the discharge of fluid from chamber D through the high pressure outlet, as mentioned above, since the check valve H prevents fluid flow from chamber D to chamber C.

In the form of the invention shown in Figures 1 to 7, inclusive, the control valve operates automatically. The motor piston transmits motion at each end of its stroke to a portion of the valve mechanism to effect a shift of the valve mechanism which causes reverse movement of the main piston. The main piston will continue to reciprocate as long as fluid under pressure is supplied thereto until the fluid pressure at the outlet reaches a predetermined value. At this time the piston will stall. When the pressure at the outlet is reduced the piston will resume operation, moving in the same direction as previously until it reaches the end of its stroke and again shifts the valve mechanism.

Figure 5:
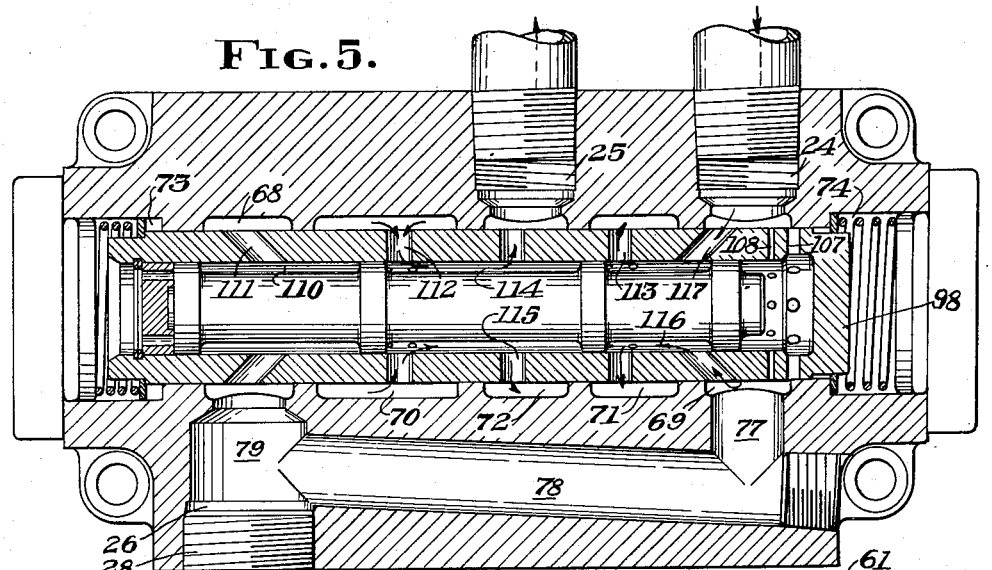
Fig. 5 is a detail horizontal, sectional view taken through the valve portion of the pressure booster on the plane indicated by the line V—V of Fig. 1.

In the form of the invention illustrated, this device includes a one-piece body 21 having a motor chamber 22 formed therein and a valve chamber 23 below the motor chamber and extending parallel thereto, the body having inlet and outlet ports 24 and 25 formed therein in communication with the valve chamber. As illustrated in Figures 3 and 5 a second set of inlet and outlet ports 26 and 27 are provided to adapt the unit to Army and Navy standards, these latter ports being closed in the present instance by plugs 28 and 30, respectively. The second set of inlet and outlet ports communicate with the first set of such ports through drilled openings so that fluid flowing through either set of such ports will reach the same parts of the device. It will be obvious that when the second set of inlet and outlet ports are employed, suitable plugs will be inserted in the ports of the first set to prevent the escape of operating fluid.

The motor chamber 22 includes sections 31 and 32 of different diameters, the ends of the motor chamber being closed by caps 33 and 34 which are secured to the ends of the body by cap screws 35. The motor chamber receives for reciprocatory movement therein a combination motor and pump piston 36 which includes portions 37 and 38 the first of which is disposed in the smaller chamber portion 32. This portion 37 of the piston fits the section 32 of the motor chamber relatively closely and is provided with piston rings 40 and a resilient O-ring seal 41 to prevent undue flow of fluid from one end of the chamber to the other. The other portion of the piston member 36 fits the corresponding portion of the motor chamber rather loosely, to permit fluid to flow to the end of the chamber around the piston.

The member 36 has piston cylinders 42 and 43 formed therein, the cylinder 42 being greater in diameter than the cylinder 43. The relative dimensions of the motor pump cylinders 42 and 43 are such that a pressure increase ratio of 1 to 10 is secured. Cylinder 42 receives a piston 44 which is supported by bearing shoes 45 and 46 arranged in the chamber 22 at the end of the larger section 31. These bearing shoes include a spherical bearing 47 so that the piston 44 will be self-aligning relative to the member 36. Bearing shoe 45 is loosely arranged in the chamber with a flat end surface thereof in engagement with the cap 33. Due to the looseness of this bearing member the shoe assembly may slide laterally with respect to the axis of the device to allow further alignment of the piston 44 relative to the member 36. The shoes are held in resilient engagement with the end cap 33 by a coil spring 48 disposed between the bearing shoe 46 and a bushing 50 arranged in the end of the chamber 22. The cap 33 holds this bushing firmly against a shoulder 51 formed in the chamber, the bushing having a shoulder 52 for engagement by the spring 48. The bushing also has a second shoulder 53 for engagement by a second spring 54, this spring engaging a flange 55 surrounding the end of the piston 44. This piston also serves the purpose of a check valve, it having an inclined valve surface 56 on the end adjacent the bearing shoes, this valve surface cooperating with a similar valve surface 57 formed in the shoe 46. When these surfaces are in engagement, the flow of fluid between the chamber 22 and an axial passage 58 formed in the piston 44 is prevented. This passage 58 establishes communication between a socket 59 in the shoe 46 and the inner portion of the cylinder 42. Due to the provision of the space between flange 55 and the adjacent portion of the bushing 50, slight relative movement between the piston 44 and the shoe section 43 is permitted. This relative movement permits fluid flow from the chamber section 31 into the socket 59. This relative movement will take place when fluid under operating pressure is introduced into chamber 31. This pressure is effective over a differential surface on the piston 44, the effective area facing toward the left end of the device as illustrated in Fig. 1. When the pressure is applied piston 44 will move slightly toward the right in opposition to the spring 53 until fluid may flow into the socket 59 and passage 58. The cylinder 43 also receives a piston generally indicated by the numeral 60. This piston is rigidly formed on the end cap 34 and is also provided with an axial passage 61, which establishes communication between a tapped high pressure port 62 and the inner end of the cylinder 43.

Cylinders 42 and 43 communicate with one another through a ported wall 62 formed in the member 36. The member 36 is provided with a check valve to limit the flow between the inner ends of the cylinders 42 and 43 to one direction, that is, from the larger cylinder 42 to the smaller one 43. The check valve is of the ball type having a seat 63, a ball valve 64 and a spring 65 for yieldably urging the ball into engagement with the seat member, the force of the spring being transmitted to the ball through an adapter 66. As the piston 60 is rigidly formed with the end cap 34, its position relative to the chamber 22 will be fixed, the piston 36 will be self-aligned therewith, however, due to the clearance between piston 36 and body 21. Piston rings 40 serve to seal the space between the piston and the chamber wall. It will be obvious that the piston 36 may reciprocate in the chamber 22 without bind, due to the provisions for self-alignment between the piston 36 and the pistons 44 and 60. It will also be obvious that when the member 36 reciprocates in the chamber 22, fluid will be transmitted from the cylinder 42 to the cylinder 43 and from the latter to the high pressure port 62. It will also be obvious that when the member 36 moves in one direction, fluid will flow from the chamber section 31 into the cylinder 42 past check valve surfaces 56 and 57 through passage 58.

The reciprocation of the member 36 is effected by the controlled admission of fluid under pressure alternately to opposite ends thereof. This admission of pressure is governed by the valve mechanism, indicated generally by the numeral 67, which is disposed in the valve chamber 23. The body 21 of the device has a plurality of annular grooves 68 to 74, inclusive, formed around the chamber 23, the grooves being spaced and thus providing annular ribs at the sides thereof. Chamber 23 receives the valve mechanism which comprises a sleeve member 75 and a spool member 76, the latter being disposed for sliding movement within the former. The sleeve member is in turn supported for sliding movement by the ribs between the grooves 68 to 74, inclusive.

Grooves 68 and 69 are connected with inlet port 24 as shown in Fig. 5 by a plurality of drilled holes 77, 78, and 79. It will be seen from Fig. 5 that fluid introduced under pressure through port 24 will flow through the drilled holes 77, 78, and 79, and be available for use in grooves 68 and 69. Groove 70 is connected as illustrated in Figures 1, 2, 6, and 7, by a hole 80 with motor chamber 22, this hole also being provided for the reception of a rocker link 81, which transmits motion from the member 36 to the sleeve 75. The link 81 is supported for rocking movement on a pin 82 which is in turn supported in a socket formed in the body 21 and a second socket formed in a plug 83 which closes the outer end of the hole 80. Member 36 is provided with a pair of shoulders 84 for engagement with one end of the link 81 when the member 36 reciprocates; the opposite end of the link engages the sides of a slot 85 formed in the valve sleeve 75.

Groove 71 in the body at the valve chamber is connected by an angular bore 86 with the section 32 at the end of the piston 37 of the motor chamber 22.

Groove 72 is connected by drilled openings 87, 88, and 89, with the outlet ports 25 and 27. The end grooves 73 and 74 of the valve chamber are connected, as illustrated in Fig. 4 by a plurality of drilled holes 90, 91, and 92, with the outlet ports, the drilled hole 92, intersecting drilled hole 89 as shown in Fig. 3. The ends of the valve chamber 23 are closed by caps 93, these caps having gaskets 94 to prevent the escape of fluid between them and the body 21.

Figure 6:
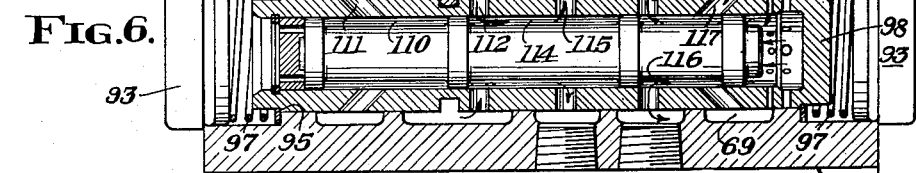
Figures 6 and 7 are fragmentary vertical longitudinal sectional views, similar to Fig. 1, showing the movable parts of the pressure booster in different positions of operation.

The sleeve 75 has shoulders 95 adjacent each end thereof, these shoulders being formed for engagement with washers 96 surrounding the reduced portions of the sleeve. These washers serve as abutment members for coil springs 97, which are provided to urge the sleeve 75 to a longitudinally centered position in the bore or chamber 23. The sleeve will occupy this center position in which it is shown in Fig. 6, when the motor piston 36 is disposed in any position intermediate its extreme end positions. When the motor piston starts to move from either of its end positions, the coil springs 97 become effective to move the sleeve 75 to its centered position.

Figure 7:
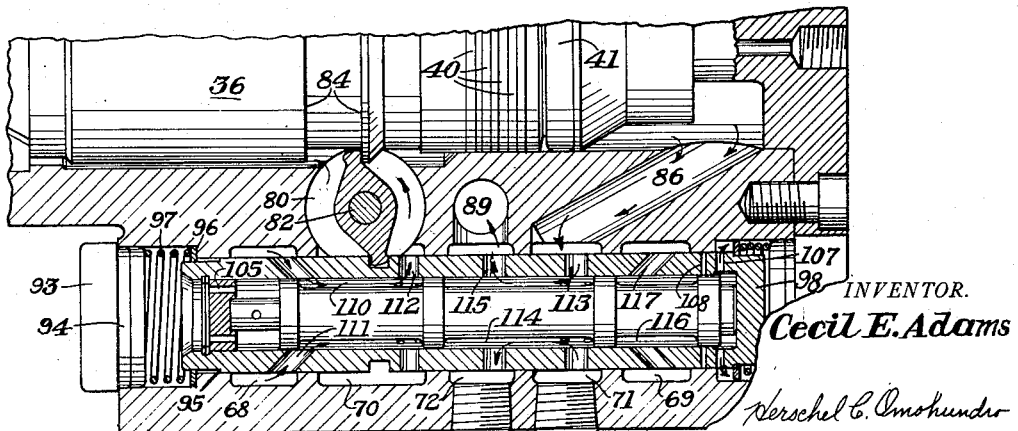

Spool 76 is normally urged toward one end of the sleeve 75, which end is closed by a wall 98, by a coil spring 100 contained within a socket 101 formed in the spool. This socket is in restricted communication with both ends of the bore in the sleeve 75 when the latter is normally positioned; a plug 102 having a T-shaped passage 103 extending into the socket 101 and engaging one end of the spring 100. This plug 102 is engaged by a cap 104 positioned in the open end of the sleeve 75, the cap having ports 105 formed therein and being held in place by snap rings 106. When the spool is normally positioned as shown in Fig. 7, restricted communication is established between the opposite ends of the sleeve. As the spool is moved, in opposition to its spring, however, to its left hand position shown in Fig. 1, this communication will be interrupted. Spool 76 is moved in this manner by fluid pressure introduced into the sleeve at its closed end through ports 107 and 108 extending laterally through the wall of the sleeve.

Under normal conditions, the sleeve 75 will occupy its centered position shown in Fig. 6 and spool 76 will occupy a position shown in Fig. 7, in engagement with the end wall 98 of the sleeve 75. When the parts are thus positioned a groove 110 in the spool 76 establishes communication between angular ports 111 formed in the sleeve, and ports 112 extending laterally thereof. Ports 111 communicate with groove 68, which contains fluid, at inlet port pressure at all times. When the parts are as set forth above, fluid will flow from the groove 68 through the angular ports 111, groove 110 and ports 112 to opening 80 from which it will flow into the motor chamber 22. This fluid will exert its force on the end surfaces of piston 36 facing toward the left as viewed in Fig. 1. This fluid will also separate valve surfaces 56 and 57 as previously described, and flow into the pump chamber 42, through the passage 58 where it will be effective on the piston surface therein facing toward the left to assist the fluid in chamber 31 in urging the piston 36 toward the right. Fluid in the chamber 22 at the right end of the piston 36 will be discharged through bore 85, groove 71, lateral ports 113, groove 114 in spool 76 and through ports 115 to groove 72 from which the fluid will flow to the outlet port 25. Since fluid at the right end of the piston may escape when fluid pressure is being applied to the left end thereof, the piston will move toward the right until one of the shoulders 84 thereon engages the rocker link 81 and moves it to a position to cause sleeve 75 to be shifted to a position wherein ports 107 and 108 communicate with groove 69. At this time fluid at inlet port pressure will flow into the interior of the sleeve 75 at the right hand end of the spool 76; this fluid will exert a force on the end of the spool 76, causing it to move in opposition to the spring 101, toward the left. When the spool moves a sufficient distance, communication between groove 110 and ports 112 will be interrupted while communication between ports 112 and ports 115 through groove 114 will be established.

The section 31 of the chamber 22 will then be in communication with the outlet port and outlet port pressure will exist therein. When spool 76 is moved in that manner, communication will be established by a groove 116 in spool 76 between ports 113 and a second set of angular ports 117, these ports communicating with groove 69 which contains fluid at inlet port pressure. Inlet port pressure will thus be applied to the right hand end of piston 36 and it will then move toward the left end of the chamber 22.

During the application of fluid, at inlet port pressure to the left end of the chamber 22 and the movement of the piston 36 to the right in response thereto, the friction between piston 44 and the wall of the cylinder 42, will tend to move valve surface 56 away from surface 57 and permit some of the fluid to flow from chamber 22 into cylinder 42. This action of opening valve 56—57 is assisted by the pressure fluid as set forth above. When piston 36 moves in the opposite direction, i. e. toward the left, the check valve at 56—57 will close, trapping the fluid in the chamber 42. Since movement of piston 36 toward the left causes movement of piston 44 into cylinder 42, the pressure on the fluid trapped therein will increase until it is sufficient to move valve 64 from its seat and flow into the inner end of cylinder 43. As this cylinder is of smaller diameter than cylinder 42, some of the fluid forced thereinto will flow into passage 61 and out through high pressure outlet 62.

It is obvious that when piston 36 moves toward the left, piston 61 will be partially withdrawn from cylinder 43 and some of the fluid injected into this cylinder from cylinder 42 will remain therein until piston 36 is again moved to the right. When this movement takes place ball valve 64 will prevent the flow of fluid from cylinder 43 to cylinder 42 and this fluid will also be discharged through passage 61 and port 62. During the movement of the piston 36 from the right extremity of its movement to the left extremity thereof, sleeve 75 will occupy the centered position in which it is shown in Fig. 6, as above-mentioned. During this movement spool valve 76 will be retained in engagement with the cover 104 at the left end of the spool by fluid pressure flowing through ports 108 from groove 69. When piston 36 approximately reaches the left end of its stroke, the second shoulder 84 thereon will engage the rocker link 81 causing it to move sleeve 75 toward the right to the position shown in Fig. 7. In this position of sleeve 76, ports 108 will no longer communicate with groove 69 and ports 107 will communicate with groove 74, which groove is connected with the outlet port. At this time spring 101 will move spool 76 toward the right, the fluid at the end of the spool being discharged through ports 107, groove 74 and passages 90 and 92, to the outlet port. After the end of the T-shaped passage 103 is exposed, some of the fluid may also flow outwardly through such passage. The parts of the device will then occupy the posititon shown in Fig. 7, in which the angular ports 111, groove 110 and ports 112 again establish communication between groove 68 and motor chamber 22 at the section 31 thereof. The opposite end of the chamber will again be connected with the outlet or exhaust, by passage 86, groove 71, ports 113, groove 114, ports 115, groove 72 and outlet port 25. The piston 36 will then move toward the right in the next cycle of operation.

It will be obvious that during each movement of the piston 36 toward the right, fluid at operating pressure will flow from the chamber 31 into cylinder 42 while fluid at the boosted or high pressure will flow from cylinder 43 through passage 61 and outlet port 62. When the piston 36 moves toward the left, fluid at the boosted or high pressure will flow from the cylinder 42 to cylinder 43. Due to the differential in areas of cylinders 42 and 43, some fluid will be discharged from the high pressure port 62 during movement of piston 36 toward the left.

It will be obvious, as has been described, that the sleeve 75 will be centered after initial movement of the piston in either direction from its extremities of travel. It will also be obvious that due to the provision of the ports 108, the spool valve 76 will remain in position to continue to direct fluid from the inlet port to the right end of the piston 36 until the piston has approximately reached the left extremity of its stroke. The spool valve will remain in this position even though the movement of the piston 36 toward the left is interrupted. After the cause of the interruption is removed, the piston will resume its movement toward the left until it shifts sleeve valve 75 to a position wherein spring 101 may move spool 76 to the position to direct fluid to the left end of the piston 36.

From the foregoing it will be seen that there has been provided a hydraulic pressure boosting device which is automatic in operation and will deliver a continuous supply of fluid at high pressure. It is compact due to the telescoping arrangement of the pistons and presents no serious leakage problems since there are no joints at which the higher pressure fluids might possibly escape, neither are any moving parts exposed.

While the form of embodiment of the present invention as herein disclosed constitutes a preferred form, it is to be understood that other forms might be adopted, all coming within the scope of the claims which follow.

I claim:

1. A hydraulic pressure booster comprising a body with a motor cylinder and a valve cylinder and inlet and outlet ports communicating with the latter; a motor piston disposed for reciprocation in said motor cylinder, said piston having communicating differential cylinder bores entering opposite ends thereof; a check valve between said cylinder bores; differential pistons supported by said body and disposed in said cylinder bores, said pistons having passages establishing communication between the motor cylinder and the larger of said cylinder bores and between the smaller of said cylinder bores and a high pressure outlet; a second check valve between the motor cylinder and the larger of said cylinder bores; valve means in said valve cylinder for alternately connecting the ends of said motor cylinder with said inlet and outlet ports, said valve means having a valve sleeve; spring means normally centering said sleeve longitudinally of said valve cylinder; means actuated by said motor piston adjacent the ends of its reciprocatory movement to move said valve sleeve toward the ends of said valve cylinder in opposition to its urging means; and a reversing valve disposed for movement in said valve sleeve; said reversing valve being normally urged toward a position to connect predetermined ends of said motor cylinder with said inlet and outlet ports and responsive to fluid pressure when said sleeve is disposed at one end of said valve cylinder to reverse the connections between the motor cylinder and the inlet and outlet ports.

2. A hydraulic pressure booster comprising a body with a motor cylinder, a valve cylinder, inlet and outlet ports communicating with the latter cylinder and a high pressure outlet; a piston member disposed for reciprocation in said motor cylinder, said member having a piston chamber opening toward each end thereof; a passage in said member establishing communication between said chambers; a check valve in said passage to limit flow therethrough to a single direction; piston means supported by said body and disposed in said piston chambers, said piston means forming passages establishing communication between said motor cylinder and said chambers and between the latter and the high pressure outlet; valve means disposed in said valve cylinder, said valve means having a reversing valve operative to alternately connect the motor cylinder with said inlet and outlet ports to effect the reciprocation of said piston member; a pilot valve in said body; means actuated by said piston member adjacent one extremity of its travel to move said pivot valve to a position to apply fluid pressure from said inlet port to said reversing valve to move the same to a position to cause movement of said piston member in a predetermined direction, and means for moving said reversing valve to a position to cause movement of said piston member in the opposite direction when said piston member has reached the extremity of movement in said predetermined direction.

3. A hydraulic booster comprising a body with a motor cylinder and a valve cylinder and inlet and outlet ports communicating with the latter; a motor piston disposed for reciprocation in said motor cylinder, said piston having a pair of communicating differential cylinder bores formed therein; a check valve between said cylinder bores; differential pistons supported by said body and disposed in said cylinder bores, said pistons having passages establishing communication between the motor cylinder and the larger of said cylinder bores and between the smaller of said cylinder bores and a high pressure outlet; valve means in said valve cylinder for alternately connecting the ends of said motor cylinder with said inlet and outlet ports, said valve means having a valve sleeve; means normally urging said valve sleeve toward a longitudinally centered position in said valve cylinder; means actuated by said motor piston adjacent the ends of its reciprocatory movement to move said valve sleeve toward the ends of said valve cylinder in opposition to its urging means; and a reversing valve disposed for movement in said valve sleeve; said reversing valve being responsive to fluid pressure when said valve sleeve is at one end of said valve cylinder to reverse the connections between the motor cylinder and the inlet and outlet ports.

4. A hydraulic pressure booster comprising a body with motor and valve cylinders, inlet and outlet ports communicating with the valve cylinder, and a high pressure outlet; a piston member disposed for reciprocation in said motor cylinder; pump means operative upon the reciprocation of said piston member to transfer fluid from said motor cylinder to said high pressure outlet; valve means in said valve cylinder for alternately connecting the ends of said motor cylinder with said inlet and outlet ports, said valve means having a reversing valve responsive to fluid pressure to cause movement of said piston member in a predetermined direction; a pilot valve actuated by said piston member adjacent one end of its movement to apply fluid at inlet port pressure to said reversing valve to cause said piston member to move in said predetermined direction, said piston member interrupting such application of pressure at the end of movement in said predetermined direction; and spring means engaging said reversing valve, said spring means being operative when the application of pressure is interrupted to shift said reversing valve to cause reverse movement of said piston member.

5. A hydraulic pressure booster comprising a body with a motor cylinder and a valve cylinder and inlet and outlet ports communicating with the latter cylinder; a member disposed for reciprocation in said motor cylinder; said member having communicating first and second cylinder bores formed therein; piston elements supported by said body and disposed in said cylinder bores; a universal mounting between at least one of said piston elements and said body; a check valve in said member between said cylinder bores; passage means formed by said piston elements to establish communication between the motor cylinder and the first cylinder bore and between the other cylinder bore and an outlet port; a check valve in the passage between the motor cylinder and the first cylinder bore; and automatic valve means in said valve cylinder to alternately connect the ends of said motor cylinder with said inlet and outlet ports.

6. A hydraulic pressure booster comprising a body with motor and valve cylinders, inlet and outlet ports communicating with said valve cylinder and a high pressure outlet; differential piston elements carried by said body and projecting into said motor cylinder; a motor piston disposed for reciprocation in said motor cylinder, said motor piston having chambers for the reception of said differential piston elements; a check valve between said chambers; passage means establishing communication between said motor cylinder and one of the chambers in said motor piston and between the other chamber and said high pressure outlet; check valve means in said passage means to prevent reverse flow therethrough; and automatic valve means in said valve cylinder to alternately connect the ends of said motor cylinder with said inlet and outlet ports.

7. A hydraulic pressure booster comprising a casing with motor and valve chambers, inlet and outlet ports communicating with said valve chamber and a high pressure outlet; differential piston elements with longitudinal passages supported by said casing and projecting into said motor chamber, the passage in the smaller piston element communicating with said high pressure outlet and the passage in the other piston communicating with said motor chamber; a check valve between the latter passage and said motor chamber; a motor piston disposed for reciprocation in said motor chamber, said motor piston having chambers for the reception of said piston elements; a check valve between the chambers in said motor piston; automatic valve means in said valve chamber to alternately connect the ends of said motor chamber with said inlet and outlet ports, said valve means having a pilot valve normally centered in said valve chamber and a reversing valve normally disposed at one end of said pilot valve to cause movement of said motor piston in a predetermined direction; and means actuated by said motor piston at the end of its movement in said predetermined direction to move said pilot valve to a position to apply fluid at inlet port pressure to said reversing valve to shift it to cause movement of said motor piston in the opposite direction.

8. A hydraulic pressure booster with a selected ratio comprising means forming large, intermediate and small cylinder bores; pistons in said cylinder bores, the cross-sectional area of the small piston being equal to the quotient of the cross-sectional area of the large piston divided by the ratio of the pressure booster and the cross-sectional area of the intermediate piston being equal to the sum of the area of the small piston plus the quotient of the difference in areas of the large and small pistons divided by the ratio of the pressure booster; valve means for alternately directing fluid pressure to opposite ends of said large cylinder bore to effect relative reciprocatory movement between said pistons and their respective cylinder bores; passage means connecting said intermediate cylinder bore with a source of fluid and said intermediate and small cylinder bores with each other; check valve means in said passages to permit fluid flow from said source to said intermediate and then to said small cylinder bore and prevent reverse flow; and an outlet from said small cylinder bore for high pressure fluid.

9. A double acting hydraulic pressure booster with a predetermined ratio comprising means forming large, intermediate and small cylinder bores, the cross-sectional area of the small cylinder bore being equal to the quotient of the cross-sectional area of the large cylinder bore divided by the ratio of the pressure booster and the cross-sectional area of the intermediate cylinder bore being equal to the sum of the cross-sectional area of the small cylinder bore plus the quotient of the difference in cross-sectional areas of the large and small cylinder bores divided by the ratio of the pressure booster; pistons disposed in said cylinder bores, said pistons being so arranged that reciprocation of said large piston causes alternate relative inward and outward movement between said intermediate and small pistons and the respective bores therefor; means for alternately connecting the opposite ends of said large cylinder bore with a source of fluid pressure and exhaust; a check-valve controlled passage providing for fluid flow from said intermediate to said small cylinder bore; and a second check-valve controlled passage providing for the admission of fluid from a pressure source to said intermediate cylinder bore.

10. A double acting hydraulic pressure booster with a predetermined ratio comprising means forming large, intermediate and small cylinder bores, the cross-sectional area of the small cylinder bore being equal to the quotient of the cross-sectional area of the large cylinder bore divided by the ratio of the pressure booster and the cross-sectional area of the intermediate cylinder bore being equal to the sum of the area of the small cylinder bore plus the quotient of the difference in cross-sectional areas of the large and small cylinder bores divided by the ratio of the pressure booster; pistons disposed in said cylinder bores, opposite relative movement between said intermediate and small pistons and their respective cylinder bores occurring simultaneously; a passage connecting one end of said large cylinder bore with said intermediate cylinder bore a check valve in said passage operating to prevent flow from the intermediate to the large cylinder bore; a second passage connecting said intermediate and small cylinder bores; a check valve in said second passage to prevent flow from said small to said intermediate cylinder bore; an outlet leading from said small cylinder bore; and means for alternately connecting the opposite ends of said large cylinder bore with a source of fluid pressure and exhaust.

11. A hydraulic pressure booster with a selected ratio comprising a body forming large, intermediate and small cylinder bores; pistons in said cylinder bores, the cross-sectional area of the small piston being equal to the quotient of the cross-sectional area of the large piston divided by the ratio of the pressure booster and the cross-sectional area of the intermediate piston being equal to the sum of the area of the small piston plus the quotient of the difference in area of the large and small pistons divided by the ratio of the pressure booster; valve means for alternately directing fluid pressure to opposite ends of said large cylinder bore to effect reciprocation of all pistons in their respective cylinder bores; passage means connecting said intermediate cylinder bore with a source of fluid and said intermediate and small cylinder bores with each other; check valve means in said passages to permit fluid flow from said source to said intermediate and then to said small cylinder bore and prevent reverse flow; and an outlet from said small cylinder bore for high pressure fluid.

12. A hydraulic pressure booster with a selected ratio comprising a body forming large intermediate and small cylinder bores; pistons connected for movement in unison in said cylinder bores, the large piston constituting a motor piston and the intermediate and small pistons constituting pump pistons, the cross-sectional area of the small piston being equal to the quotient of the cross-sectional area of the large piston divided by the ratio of the pressure booster and the cross-sectional area of the intermediate piston being equal to the sum of the area of the small piston plus the quotient of the difference in area of the large and small pistons divided by the ratio of the pressure booster; valve means for alternately applying fluid pressure to opposite ends of said motor piston to effect reciprocation of all pistons in their respective cylinder bores, the intermediate and small pistons moving in opposite directions relative to their respective cylinders; passage means connecting said intermediate cylinder bore with a source of fluid and said intermediate and small cylinder bores with each other; check valve means in said passages to permit fluid flow from said source to said intermediate and then to said small cylinder bore and prevent reverse flow; and an outlet from said small cylinder bore for high pressure fluid.

13. A hydraulic pressure booster comprising a body having a piston chamber, a valve chamber and inlet and outlet ports communicating with the latter chamber; differential pumping pistons supported by said body and projecting into said piston chamber; a motor piston disposed for movement in said piston chamber, said motor piston having piston chambers receiving said pumping pistons; means between one of said pumping pistons and said body providing for limited lateral movement relative to the axis of said motor piston, said pumping pistons having passages formed therein, the passage in the smaller piston communicating with a high pressure outlet, the passage in larger pumping piston communicating with the chamber in said body; check valve means between the passage in said larger pumping piston and the chamber in said body; a passage in said motor piston connecting said pumping piston chambers; a check valve in said last-mentioned passage; valve means in said valve chamber having a ported sleeve element; a rocker link operated by said motor piston immediately prior to the termination of movement thereof in either direction to move said sleeve element to establish and interrupt communication between a pressure source and the interior of said sleeve element at one end thereof; a spool element movably disposed in said sleeve element to establish communication between certain ports in said sleeve and provide for fluid flow from said inlet port alternately to the ends of said piston chamber; and means normally urging said spool element toward the end of said sleeve element which communicates with a pressure source when said motor piston approaches one end of its travel.

CECIL E. ADAMS.

References Cited in the file of this patent

UNITED STATES PATENTS

| Number | Name | Date |
|---|---|---|
| 2,296,647 | McCormick | Sept. 22, 1942 |
| 2,336,446 | Tucker et al. | Dec. 7, 1943 |
| 2,479,856 | Mitton | Aug. 23, 1949 |

FOREIGN PATENTS

| Number | Country | Date |
|---|---|---|
| 180,671 | Great Britain | Aug. 3, 1922 |